United States Patent [19]

Johnson

[11] 4,030,110

[45] June 14, 1977

[54] PHOTOGRAPHIC APPARATUS HAVING A REFLEX OPTICAL SYSTEM

[75] Inventor: Bruce K. Johnson, Andover, Mass.

[73] Assignee: Polaroid Corporation, Cambridge, Mass.

[22] Filed: Mar. 3, 1975

[21] Appl. No.: 554,928

[52] U.S. Cl. .................... 354/152; 354/84
[51] Int. Cl.² .......................... G03B 19/12
[58] Field of Search .......... 354/152, 153, 154, 155, 354/156, 158, 150, 140, 85, 86, 84, 187, 188, 189, 192, 193, 194

[56] References Cited

UNITED STATES PATENTS

| 1,991,768 | 2/1935 | Neumann | 354/104 |
| 3,543,661 | 12/1970 | Rosen | 95/11 |
| 3,668,991 | 6/1972 | Erlichman | 95;354/39;150 |
| 3,678,831 | 7/1972 | Baker | 95/13 |
| 3,683,770 | 8/1972 | Land et al. | 354/150 X |
| 3,732,099 | 5/1973 | Chen | 96/29 R |
| 3,760,704 | 9/1973 | Baker | 354/155 |
| 3,791,274 | 2/1974 | Hansen | 95/11 R |
| 3,800,309 | 3/1974 | Land | 354/152 |

Primary Examiner—Edna M. O'Connor
Attorney, Agent, or Firm—John S. Vale; Edward S. Roman

[57] ABSTRACT

Photographic apparatus, preferably a camera, having a reflex optical system for exposing film units which include a transparent outer sheet or layer through which image-bearing light is transmitted to expose photosensitive materials within the film unit. A reflex mirror, forming part of the optical system, is arranged at an optimized position with respect to the camera exposure plane to prevent light rays reflected from the transparent outer sheet from impinging the mirror at an angle of incidence which would redirect the light rays back to the film unit thereby causing a second exposure or "ghost image".

15 Claims, 6 Drawing Figures

PHOTOGRAPHIC APPARATUS HAVING A REFLEX OPTICAL SYSTEM

BACKGROUND OF THE INVENTION

The present invention relates to the field of photography and, more particularly, to photographic apparatus having reflex optical systems (a folded optical path from the lens to the exposure plane) for exposing film units of the type which includes a transparent outer sheet or layer through which image-bearing light is transmitted to expose photosensitive materials within the film unit.

DESCRIPTION OF THE PRIOR ART

The most recent generation of "one-step photographic systems" feature compact reflex cameras and "integral" film units which may be exposed, processed, and viewed without having to superpose and peel apart separable positive and negative film unit elements.

Structurally, the integral film unit comprises a plurality of layers, including photosensitive and image-receiving layers, sandwiched between a pair of outer support sheets or layers. At least one of these outer support sheets or layers is transparent and defines an "exposure window" through which image-bearing light is transmitted to expose the photosensitive materials within the film unit.

Subsequent to exposure, a fluid processing composition is distributed between a predetermined pair of the layers to initiate a development and diffusion transfer process, thereby producing a positive image.

One general type of integral film unit includes one transparent outer support sheet and an opaque support sheet on the opposite side. This single transparent sheet serves as both the exposure window and a viewing window through which the positive image may be observed. Another type of integral unit has transparent outer support sheets on opposite sides, one serving as an exposure window, the other as a viewing window.

For representative examples of the two general types of integral self-developing film units, reference may be had to U.S. Pat. No. 3,415,644 issued to E. H. Land on Dec. 10, 1968 U.S. Pat. No. 3,594,165 issued to H. G. Rogers on July 20, 1971.

In a preferred embodiment, the transparent outer sheet is formed of a material which, in addition to its transparent qualities, is durable so as to provide protection for the finished photograph. Suitable materials include natural and synthetic polymeric materials such as nylon, polyesters such as polyethylene terephthalate (Mylar) polymeric cellulose such as cellulose acetate, polycarbonates, polystyrenes and the like.

An inherent quality of suitable transparent material is that the outer surfaces are smooth and have a glossy appearance. This indicates that at least a small portion of light incident thereupon is reflected rather than being transmitted. For example, in a film unit having a Mylar outer transparent sheet, or exposure window, approximately 4% of incident light is reflected while the remaining approximately 96% is transmitted therethrough.

The limited reflective characteristic of the exposure window presents the camera designer with a problem that did not have to be considered with earlier known self-developing film units and conventional film units wherein image-bearing light is incident upon a photosensitive emulsion that has a matte or substantially non-reflective surface. In general, any light rays that are reflected or scattered by a matte emulsion are of very low intensity and may be absorbed by simple baffles or light-absorbing structure enclosing the optical path between the lens and exposure plane before such low intensity rays may be reflected back onto the emulsion.

The transparent outer sheet, or exposure window, of an integral film unit must be considered to be a low efficiency reflective surface in overlying relation to the photosensitive layer or layers because it will reflect substantially more incident light than a matte surface. In designing a conventional camera, having a straight line optical path from the lens to the exposure plane, more thought must be given to the design and materials used to absorb or attenuate, reflected or scattered light away from the exposure plane.

The single transparent window type of integral film unit requires that the imaging optical system provide an image reversal so that the final positive image appears in the same orientation as the original scene. The most common method or providing this reversal is to include a reflex mirror in the optical path between the camera's objective lens and exposure plane. In addition to providing the required image reversal, the mirror allows the lens to exposure plane path to be folded thereby providing a major benefit in terms of a reduction in overall camera size. In a typical camera for exposing snapshot sized film units (image-forming area approximately 3 inches × 3 inches) the back focal length of the lens may range from 3.5 inches to 5 inches (depending on the desired field of view) and folding the lens to exposure plane path results in significant reductions in the overall camera dimensions.

With a reflex mirror positioned over and at an oblique angle to the exposure plane, the limited reflective quality of the transparent exposure window takes on a new significance. It has been discovered that at certain extreme scene lighting conditions, it is possible to detect secondary or "ghost" images of brightly illuminated objects in the final positive print.

Analysis of such photographs indicates that some light rays are reflected from the transparent outer sheet and impinge upon the reflex mirror at appropriate angles of incidence such that these rays are once again reflected from the reflex mirror to the exposure window of a film unit located at the exposure plane but are displaced from the original point of impingement thereby producing ghost images.

It will be noted that these ghost images are not in sharp focus and may be thought of in terms of scattered light producing spots or zones of flare. Since only approximately 4% of the incident light is reflected from the outer transparent sheet, and there is additional light loss or attenuation attributable to the path length to the reflex mirror and back to exposure plane, only the most extreme scene lighting conditions will produce a visible area of flare in the final print.

The most common picture taking situations that produce the effect are interior scenes where artificial illumination is used and there is a mirror or other reflective surface in the scene that reflects an image of the ignited photoflash lamp directly at the objective lens, and outdoor scenes where the foreground is in deep shadows and the background includes intensely illuminated clouds or direct rays of the sun. The effect is also observed in time exposure photographs of a lighted candle in an otherwise darkened room.

It has been determined that the ghost image or flare problem relates to the angle and spacing of the mirror with respect to exposure plane and also the size of the mirror in relation to the bounds of the cone of image-bearing light required to fill the exposure window of the film unit. The camera housing has a lower section for receiving a film container holding a plurality of film units, and the exposure plane is substantially parallel to a planar bottom wall of this lower section. The reflex optical system includes a lens that is mounted on an upper portion of the housing such that the optic axis of the lens is at an acute angle with respect to exposure plane and bottom wall.

If the user wishes to rest the camera on a table or other flat surface for support when making a long exposure of a poorly illuminated scene, the lens axis is not parallel to the table or surface but rather points downwardly toward the surface. In order to aim the camera so that the lens axis is parallel to the support surface, the leading end of the camera bottom wall must be raised a few inches. The ideal way to do this is to insert a wedge shaped support between the support surface and bottom wall but such a device is rarely available when needed. Instead, the photographer usually tries to achieve proper camera inclination by inserting a small object, such as a cigarette pack, under the leading end of the bottom wall with less than satisfactory results.

SUMMARY OF THE INVENTION

The present invention provides a photographic apparatus, preferably in the form of a reflex camera for use with integral self-developing film units. The camera features a reflex optical system wherein: 1) the mirror is positioned to eliminate the earlier described flare problem; 2) the mirror is spaced at a minimum distance from the exposure plane consistent with elimination of flare to minimize the overall height of the camera; and 3) the optical axis of the objective lens is at least substantially parallel with a flat bottom wall of the camera housing so that the bottom wall may be placed on a flat surface for steadying the camera during long interval exposures.

In the following detailed description of the invention, reflex optical systems will be analyzed by ray tracing techniques to explain the cause of the ghost images and to provide the necessary information for designing reflex systems that exhibit no flare and yet are compact to minimize the overall height with respect to the flat bottom wall of the camera housing.

Therefore, it is an object of the invention to provide a photographic apparatus having a reflex optical system for exposing integral film units wherein the size of the apparatus is at a mimimum, the optic axis of the lens is substantially parallel to a flat bottom wall of the apparatus, and the reflex mirror is of proper size and located at an angle to and mimimum spacing from the exposure plane to prevent "ghost image or flare".

It is another object to provide such an apparatus wherein light rays that are reflected from a substantially transparent outer sheet or layer of an integral film unit and are incident upon the reflex mirror are reflected from the reflex mirror to locations within the apparatus that are outside of the bounds of the film unit's exposure window.

In brief, the size, angle and spacing of the mirror are chosen so that light rays reflected from the substantially transparent outer sheet and incident upon the reflex mirror reflected therefrom to locations within the camera housing that are outside of the bounds of the film unit's exposure window. Conventional baffling and light-absorbing and attenuation techniques are employed to insure that these light rays are not once again reflected back at the exposure window.

In keeping with the concept of minimizing the height of the camera, it may be preferable to locate the camera's exposure plane at a slight angle to the flat bottom wall of the camera to accommodate a slightly wedge shaped film container having relatively thick pods of processing composition at the leading ends of a stack of integral self-developing film units held within such a container.

The angle of the exposure plane will then determine the reflex mirror angle so that the optic axis of the lens may be located in a substantially parallel relationship with the flat bottom wall of the camera.

Other objects of the invention will, in part, appear hereinafter and will, in part, be obvious.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
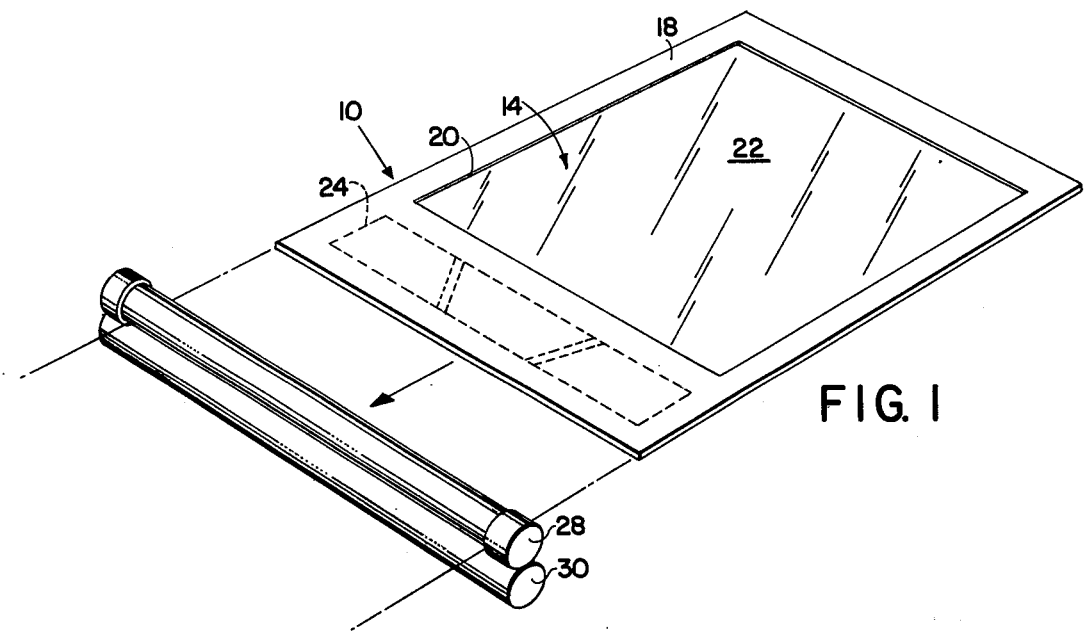
FIG. 1 is a perspective view of an integral self-developing film unit showing an exposure window through which actinic radiation is directed to expose photographic materials within the film unit, and a pair of pressure-applying rollers through which the film unit is advanced, subsequent to exposure, to discharge and distribute a fluid processing composition between predetermined layers of the integral film unit.
Figure 6:
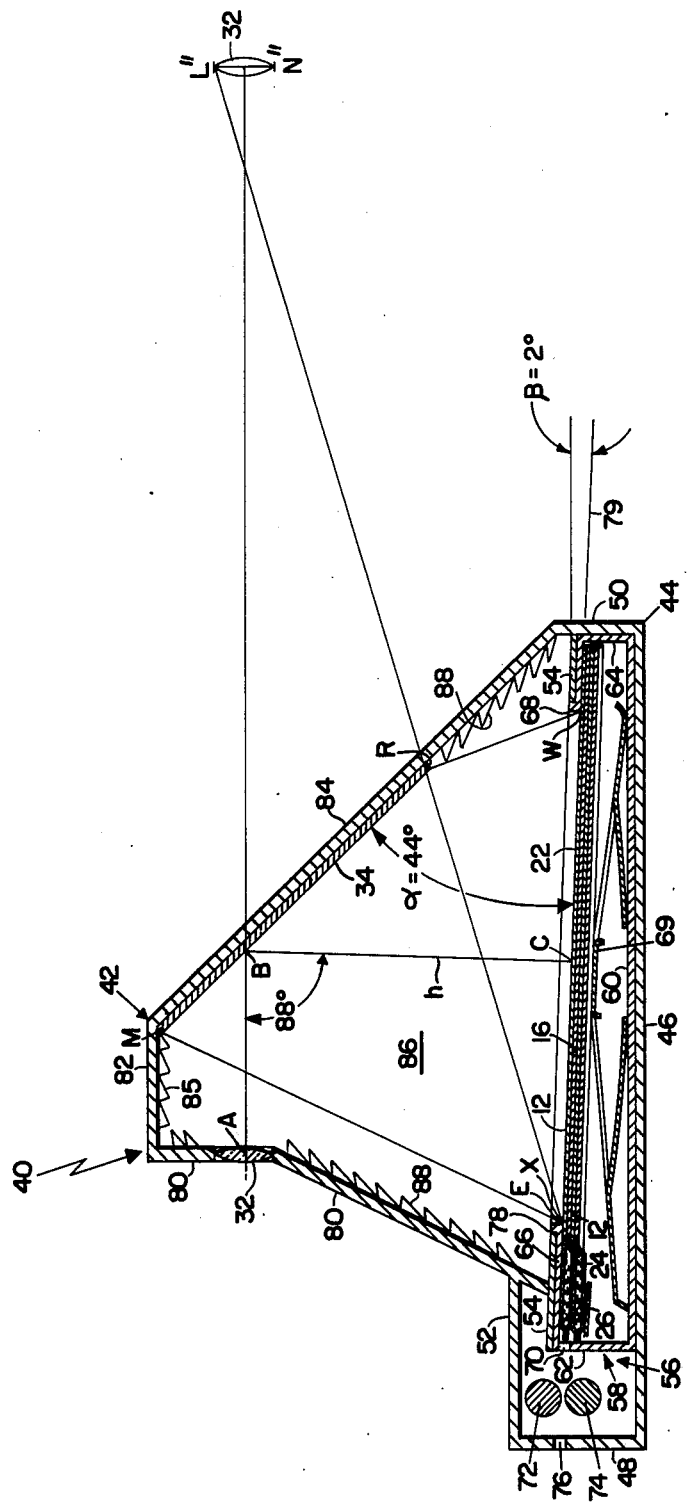
FIG. 6 is an elevational view, partly in section, of a camera having an optimized reflex optical system which does not exhibit flare and has the optical axis of the objective lens in substantially parallel relation to a flat bottom wall of the camera.

FIGS. 1 and 6 of the drawings show an "integral" self-developing film unit 10. It includes an opaque bottom outer support sheet or layer, a transparent top outer support sheet or layer, and a plurality of superposed layers of photographic materials, including one or more photosensitive and image-receiving layers, sandwiched between the two outer sheets or layers. The photosensitive layer or layers are adapted to be exposed by actinic light transmitted through the top transparent outer sheet. After exposure, a fluid processing composition is distributed between a pair of predetermined adjacent layers within the film unit to initiate a development and diffusion transfer process.

In a preferred embodiment, the plurality of layers and outer sheets comprise a laminate. The laminate has been diagrammatically illustrated in FIG. 6 as including a top sheet-like element 12 (comprising a transparent outer sheet or layer 14 shown in FIG. 1 and certain other chemical layers thereon) and a bottom sheet-like element 16 (comprising an opaque bottom outer sheet or layer and certain other chemical layers thereon). It will be understood that the interface between elements 12 and 16 represents an interface between a pair of predetermined layers within the laminate. The term "layer" will apply equally to an outer sheet and the layers between the outer sheets.

For a detailed description of multi-layer structure of film unit 10, see U. S. Pat. No. 3,415,644 issued to E. H. Land on Dec. 10, 1968.

The laminate's structural integrity may be enhanced or provided, in whole or in part, by a binding member 18 which extends around the edges of the laminate. A sqaure or rectangular opening 20 is provided in binding member 18 which exposes the top outer transparent sheet or layer 14 and defines the bounds of a square or rectangular exposure window 22 on the top side of the film unit.

At the leading end of the film unit 10 is a rupturable container 24 holding a supply of fluid processing composition 26. Container 24 is configured to rupture in response to the application of a compressive pressure thereto and discharge the fluid processing composition 26 in a mass towards the trailing end of the film unit.

In use, film unit 10 is subjected to actinic radiation which is directed through the exposure window 22 (transparent outer sheet or layer 14) to photoexpose the underlying photosensitive layer or layers. The film unit 10 then may be advanced, container 24 first, between a pair of juxtaposed cylindrical rollers 28 and 30 (see FIG. 1) for discharging and distributing the fluid processing composition 26 between the predetermined pair of layers.

In a preferred embodiment, the outer transparent sheet 14 may be formed of any suitable material which is substantially transparent to light in the visible spectrum and is durable so as to provide protection for the final positive print. Suitable materials may include natural and synthetic polymeric materials such as nylon, polyesters such as polyethylene terephthalate (Mylar), polymeric cellulose such as cellulose acetate, polycarbonates, polystyrenes and the like.

The term "substantially transparent" refers to the fact that at least a small portion of the incident light is reflected from, rather than being transmitted through, the outer support sheet 14. For the purposes of this disclosure, we shall assume that the outer support sheet 14 is formed of Mylar, and that approximately 4% of the incident light is reflected from the outer surface while 96% of the incident light is transmitted therethrough. It should be understood that the 4% figure refers to a light ray that is incident in a direction that is normal to the plane of outer sheet 14 and that as the angle of incidence decreases toward the margins of exposure window 22, the percentage of reflected light will increase slightly. When further reference is made to transparent outer sheet 14, it will be understood that sheet 14 is substantially transparent and that a very small portion of incident light will be reflected therefrom.

FIG. 2 through 5 of the drawings are diagrammatic illustrations of reflex optical systems for exposing an integral self-developing film unit 10. The optical system comprises an objective lens 32 (having a diameter d between edges L and N) for transmitting light bearing an image of a scene to be photographed, and a reflex mirror 34 positioned to reflect the image-bearing light through the exposure window 22 of a film unit 10 located at the exposure plane 36 of a photographic apparatus or camera.

The longitudinal dimension of exposure window 22 is between points E and W on the exposure plane 36.

Mirror 34 is positioned over the exposure window 22 at an oblique angle $\alpha$ with respect to the exposure plane 36. A center light ray ABC from lens 32 impinges mirror 34 at point B and is directed downwardly such that it impinges the center of exposure window 22 at point C in a direction normal thereto. Mirror 34 is spaced from the exposure plane at a distance $h$ which is equivalent to the normal or perpendicular segment BC of the center light ray ABC.

Mirror 34 is preferably trapazoidal in shape with its narrowest dimension at the top end designated M and its widest dimension at the bottom designated R. The edge rays of light transmitted by lens 32 are designated LME and NRW.

By virtue of mirror 34, the optical path ABC from lens 32 to the film unit 10 is folded and thereby achieving a significant reduction in height of the optical system.

If an observer were to place himself at the exposure plane 36 and look upwardly at mirror 34, he would observe a virtual image of lens 32 behind mirror 34 at a central ray distance equivalent to line AB. The virtual image of lens 32 is shown in dotted lines along with the central and edge rays. The virtual image is designated L'N'.

To illustrate the "ghost image" or flare effect, it is helpful to trace a ray of light transmitted through lens 32 at point F. The light ray is incident upon mirror 34 at point G and is reflected downwardly to impinge upon the transparent outer sheet 14 at point H. At point H most of the light energy is transmitted through sheet 14 for the purpose of exposing the photosensitive layer or layers therebelow. However, a small portion of the light is reflected from the outer surface of transparent sheet 14 and it is incident upon mirror 34 at point I. From point I the light ray is reflected downwardly and once again impinges transparent outer sheet 14 at point J. Therefore, one may think in terms of a transmitted light ray FGH and a reflected light ray HIJ. It will be noted that the point of incidence J is displaced from the original point of impingement H thereby producing the "ghost image effect."

In most picture taking situations, the reflected light ray HIJ will not cause sufficient exposure to the photosensitive layer below to be visible in the final positive print. This is because the intensity of the reflected ray HIJ is substantially less than other light rays that are directly reflected from mirror 34 and are incident on the exposure window 22 in the area of location J.

If, however, the intensity of the light ray FGH is high and represents a brightly illuminated portion of the scene to be photographed, and the other light rays directed to location J directly from mirror 34 are relatively low in intensity representing a dark object or a dimly illuminated portion of the scene, then the intensity of the reflected ray HIJ may be sufficient to photoexpose the photosensitive layer such that a ghost image is visible in the final positive print.

In order to avoid confusion, a light ray that passes through lens 32 and is reflected through the exposure window 22 by mirror 34 will be designated as a primary ray such as FGH. Light rays that originate as a reflection from the transparent outer sheet 14, such as ray HIJ, will be designated as a secondary light ray.

All secondary light rays will not be transmitted through the exposure window 22 to cause secondary exposures. For example, secondary rays emanating from primary edge rays LME and NRW will be reflected by transport outer sheet 14 in directions such that they do not impinge mirror 34 between its edges M and R. Other secondary rays are incident upon mirror 34 by are reflected therefrom to points that are outside of the bounds of the film unit exposure window 22 (between points E and W) of film unit 10. For example, the primary light ray ABC induces a secondary light ray CBA which is not transmitted in a direction to pass through the film unit's exposure window 22.

Figure 3:
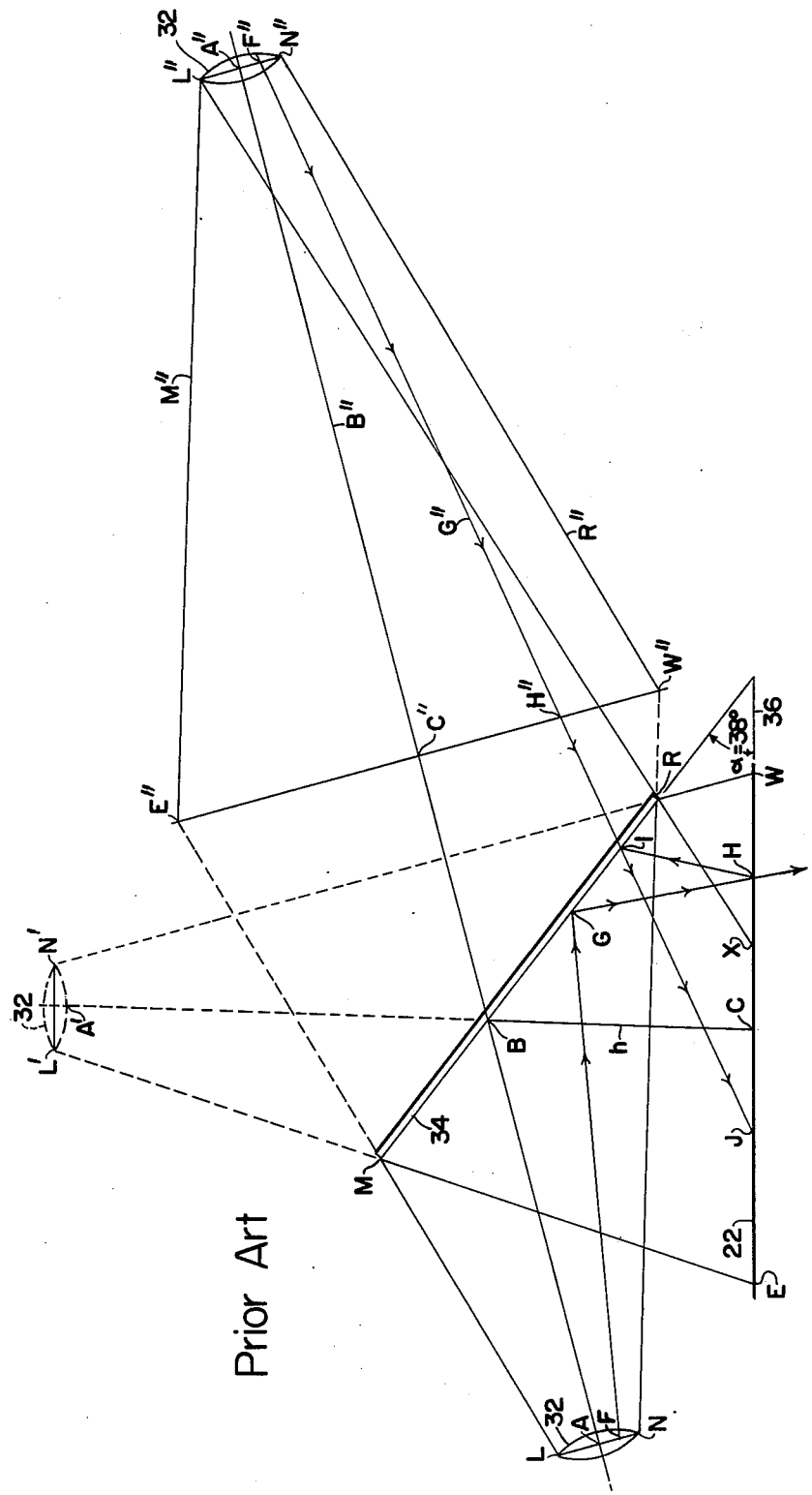
FIG. 3 is a diagrammatic illustration of the reflex optical system of FIG. 2 with a ray tracing analysis of the flare problem.

An analysis of a secondary ray is shown in FIG. 3 of the drawings. Again, it is helpful to imagine being positioned at the exposure window 22 of the film unit 10 facing mirror 34. As noted earlier, the virtual image L'N' of lens 32 appears directly behind the mirror and is of substantially the same intensity as would be observed if one were to look directly at the rear of the actual lens 32. Thus, the primary rays appear to come from this virtual image of lens 32.

An observer at the exposure window 22 would also see a virtual image of the exposure window 22 behind and off to the right of mirror 34. This virtual image is designated by line E"W". Because the transparent outer sheet 14 has a reflective characteristic, the virtual image of the exposure window E"W" appears to the observer as a low efficiency mirror. If the observer on the exposure window 22 were now to turn around and face the exposure window 22, and look at it as a limited efficiency mirror, he would observe a low intensity secondary virtual image of lens 32 via reflection from mirror 34. This virtual image would appear to be behind the exposure window as the observer faces it.

In FIG. 3, the secondary virtual image, designated L"N" is graphically shown at the distance equivalent to ABC to the right of the virtual image E"W" of the exposure window 22. This virtual image of the lens, however, is of much lower intensity that the first virtual image L'N' because of the relatively low efficiency of the Mylar acting as a mirror.

Now if the observer again positions himself on the exposure window 22 and looks at mirror 34, he observes both a full intensity virtual image L'N' of the lens directly ahead of him which accounts for the primary rays and he also may see (if he is in a correct position on the exposure window 22) the relatively low intensity virtual image L"N" of lens 32 which accounts for the secondary rays.

By graphical analysis, it can be shown that the flare causing ray segment IJ is a straight line continuation of the low intensity virtual image of ray F"G"H".

The graphical technique illustrated in FIG. 3 allows us to easily represent the secondary rays as extensions of the virtual images of primary rays emanating from the virtual image L"N" of lens 32. For a light ray, reflected from the transparent outer sheet 14, to be incident upon the reflex mirror 34, an extension of the virtual image of the primary ray must graphically intersect mirror 34 between its edges M and R. For example, it can be shown that extensions of the virtual images of the edge rays L"M"E" and N"R"W" do not intersect mirror 34 thereby indicating that secondary rays associated with these edge rays would not be incident upon the front reflective face of mirror 34 after being reflected from the transparent outer sheet 14. On the other hand, an extension of the virtual image of center ray, A"B"C", does intersect mirror 34 thereby allowing one to predict that the secondary ray, CBA, would impinge upon mirror 34. Therefore, one can conclude that as a first precondition to causing flare, the secondary light ray must impinge mirror 34 after being reflected from the exposure window 22.

The second condition or requirement for a secondary light ray to be transmitted through the exposure window 22, is that it must impinge upon mirror 34 with an angle of incidence that will cuase the secondary light ray to be reflected downwardly and within the bounds of the exposure window 22. From FIG. 3, it can be seen that the extension of center light ray A"B"C" while meeting the first condition, does not meet the second condition because the secondary light ray or extension of ray A"B"C" does not fall within the bounds of the exposure window, i.e., it does not intersect the exposure plane 36 between points E and W.

By use of the above technique, one can graphically illustrate whether there will or will not be a flare problem merely by drawing a series of straight line light rays from the second virtual image L"N" of lens 32 through mirror 34 to see if extension of these rays impinge the exoosure window 22 of the film unit. Since the straight line path must intersect mirror 34, it is helpful to draw a line from point L" of the virtual image L"N" of lens 32 through the lower corner R of mirror 34. It can be seen in FIG. 3 that an extension of this line L"R intersects the exposure window 22 at point X. This represents a boundary of possible light rays that may impinge upon the exposure window 22. If a diagrammatic light ray from point L" was drawn below point R, it would not meet the first condition of intersecting mirror 34. This analysis allows one to show that between points W and X on the exposure window, there will be no secondary light rays that may impinge this area. Therefore, any secondary light rays that will cause ghost images will, by necessity, impinge the exposure window 22 between points X and E.

A line joining points L" and E deliniates the second boundary. Lines drawn above the point of intersection with the mirror 34, while meeting the first condition, do not meet the second condition of impinging the film unit 10 within the bounds of the exposure window 22.

Figure 4:
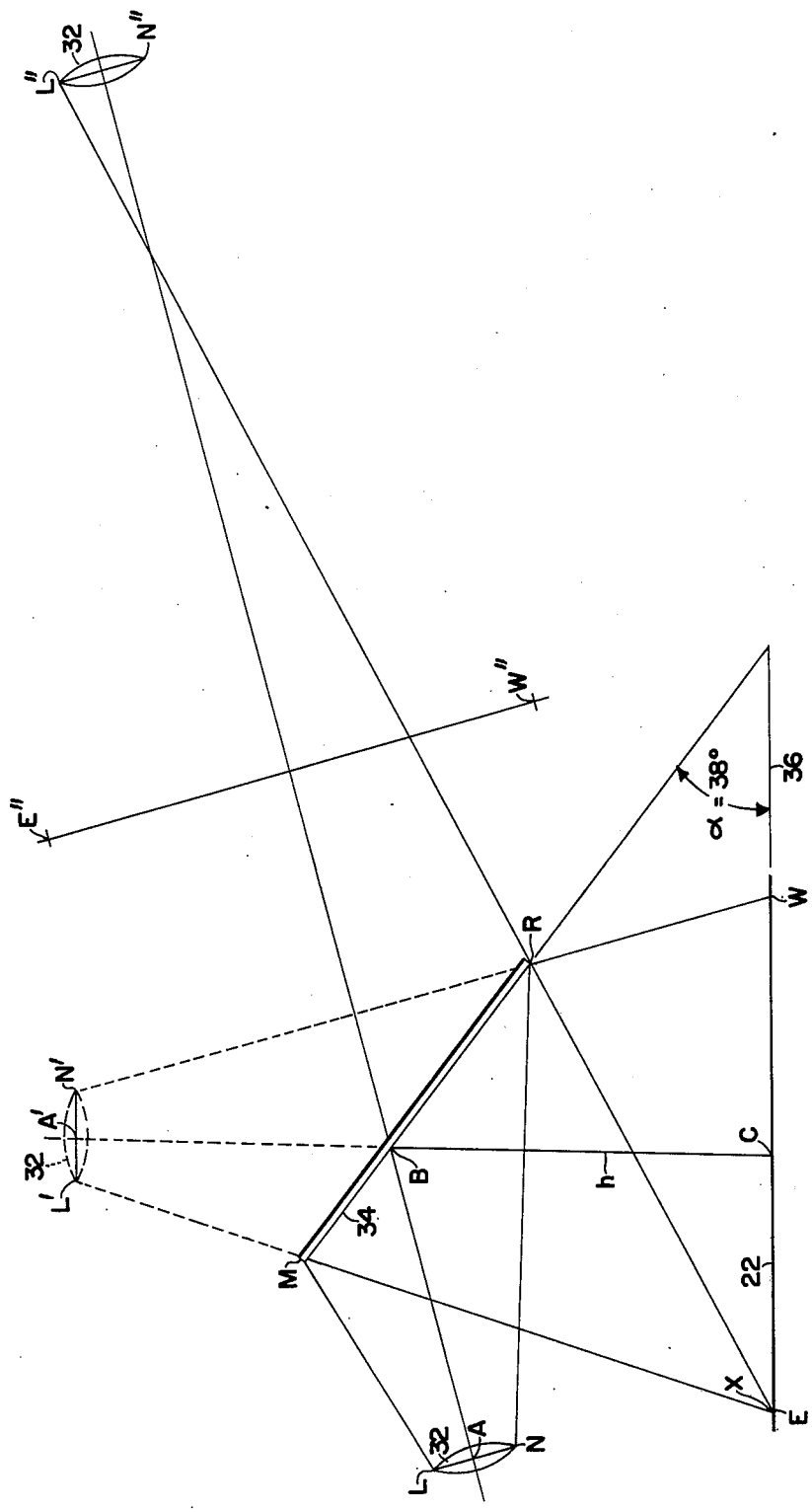
FIG. 4 is a diagrammatic illustration showing by ray tracing techniques how the flare problem is eliminated by increasing the spacing between the reflex mirror and the film unit.

From the above analysis, it is apparent that if an extension of the line connecting points L"and R intersects the film plane 36 at or to the left of point E the ghost image or flare problems will not exist. In FIG. 4 of the drawings, the mirror 34 of the optical system shown in FIG. 3 has been spaced further from the exposure window 22 of the film unit such that the ray or line L"RX intersects the exposure window at point E. Thus there is no possibility of having the flare problem in this system.

At this point it may be helpful to supply some dimensions to inform the reader of the magnitude of the change in spacing h necessary to eliminate the flare problem. The lens 32 has a back focal length ABC of 4.585 inches. The diameter d of lens 32 is 0.5625 inches. The length EW of the exposure window 22 is 3.125 inches.

In both FIGS. 3 and 4, the mirror 34 is set at an angle $\alpha$ of 38° with respect to the plane of the film unit or exposure plane 36. In FIG. 3, where the optical system exhibits the flare effect, the height h of the mirror 34 above the film unit measured along line segment BC is 1.755 inches. In order to maintain the same 38° angle of mirror 34, and eliminate the flare effect, in FIG. 4, the height of the mirror measured along line segment BC was increased to 2.50 inches. Thus, to eliminate the flare effect, the height h of the mirror was increased by 0.745 inch.

The length of the mirror 34, as measured between points M and R, is decreased as the mirror is raised higher above the film unit. It will be noted from FIG. 2 of the drawings that as the height h increases, the length of mirror necessary to intersect the edge rays of the cone of light transmitted from the lens 32 decreases. Due to this shortening of the mirror length, the overall height of the mirror 34 above the exposure plane 36 measured vertically from point M on the mirror along a perpendiculr line down to the exposure window 22, does not increase by the same value as the midpoint height h. For example, the film plane to point M height in FIG. 3 is 2.520 inches. This same dimension in FIG. 4 is 3.125 inches. Therefore, while the midpoint h of the mirror was raised 0.745 inch to eliminate the flare effect, the height of point M above the film unit only increase 0.605 inch.

FIG. 4 of the drawings shows that the flare effect can be eliminated by increasing the spacing h of the mirror 34 from the film unit and also shortening the length of the mirror as measured between M and R. If the mirror 34 in FIG. 3 was used in the system shown in FIG. 4, then the spacing h would have to be increased by more than 0.745 inch to eliminate flare because a line segment L″RX would intersect the exposure window 22 to the right of point E. Hereafter, it will be assumed that the mirror length MR is no longer than is absolutely necessary to intersect the edge rays LME and NRW of the cone of the light transmitted through lens 32.

Figure 5:
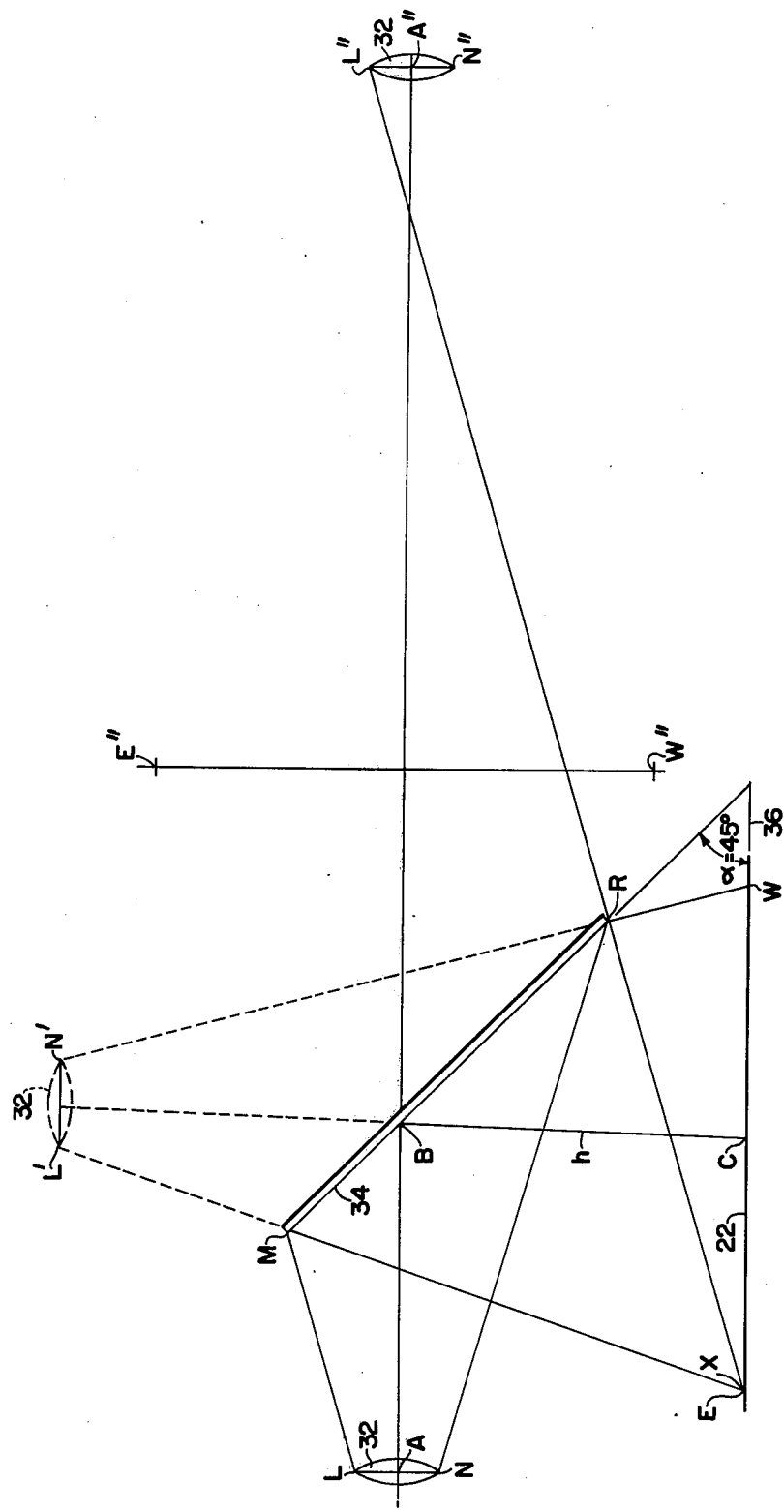
FIG. 5 is a diagrammatic illustration of a reflex optical system showing by ray tracing techniques how the flare problem may be eliminated by changing the angle of the mirror with respect to a film unit located in position for exposure.

FIG. 5 shows a reflex optical system in which both the mirror height and angle $\alpha$ have been adjusted to eliminate the flare effect. In this case, the mirror is set at an angle of 45° and the height h is 2.300 inches. By increasing the mirror angle $\alpha$, the center ray height h has been reduced by 0.200 inch from the system shown in FIG. 4 and the overall height of the mirror (point M) has been reduced by 0.125 inch.

From the foregoing, one skilled in the art will appreciate that a reflex optical system which does not exhibit the flare effect may be designed by varying the height h and angle $\alpha$ of the mirror 34. The angle and height may be adjusted independently or simultaneously depending on other considerations to be give to the design. For example, it will be noted that as the mirror 34 is spaced further and further apart from the film unit, (thus, increasing the overall height of the camera), the position of the taking lens 32 moves towards the mirror 34 thereby shortening the forward to rear dimensions or length of the camera.

In any reflex optical system of the type described, the segment BC of the center ray ABC must be reflected from the reflex mirror 34 so that it is incident at the center of the film unit exposure window 22 in a direction that is normal to the plane of the exposure window 22 or exposure plane 36 of the photographic apparatus.

Once the mirror height h and the angle $\alpha$ have been chosen, the location and angular disposition of the objective lens 32 may be plotted graphically. The construction of the normal ray segment BC shows the point of intersection of the center ray ABC with mirror 34. The center ray segment AB is then drawn at a complementary angle of incidence with mirror 34 to determine the angular disposition of the optic axis (represented by center ray segment AB) with respect to the exposure plane 36 or plane of the exposure window 22. The length of the ray segment AB is determined by subtracting the length of ray segment BC from the back focal length of lens 32. It will be understood that this calculated position is a nominal one and that lens 32 may be moved back and forth along lens axis AB for focusing purposes.

The same type of graphical analysis may be used to design a reflex camera should the lens designer be primarily concerned with the disposition of the optic axis of the objective lens with respect to the camera's exposure plane or some other surface or plane forming part of the camera housing.

Figure 2:
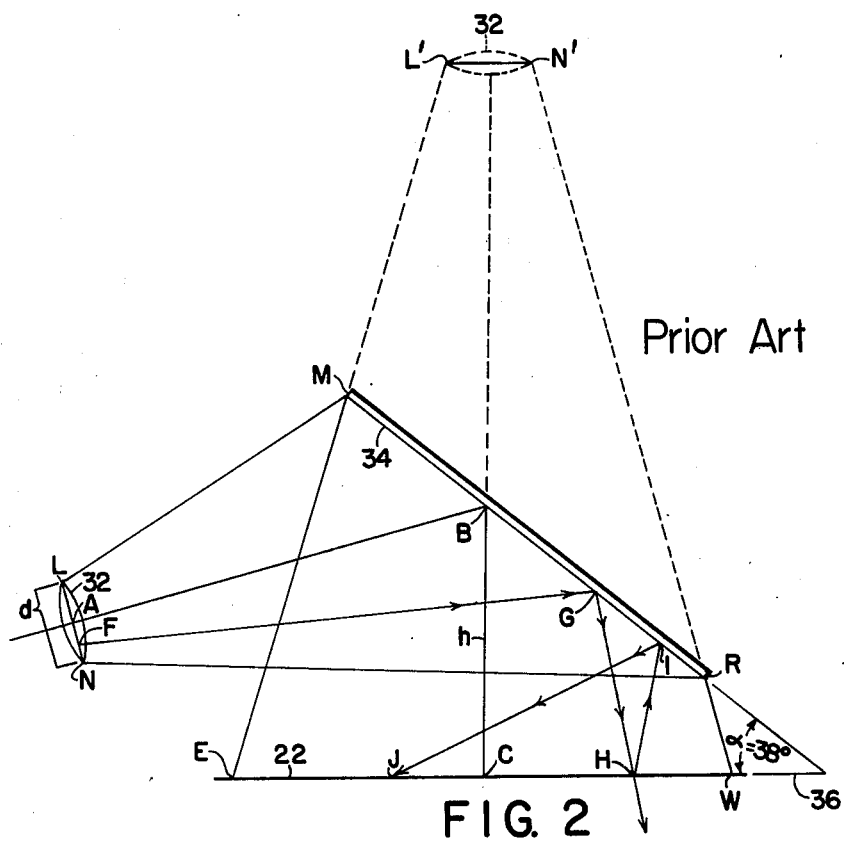
FIG. 2 is a diagrammatic illustration of a prior art reflex optical system wherein light rays reflected from the transparent outer sheet of the film unit impinge the reflex mirror and are reflected back through the film unit exposure window thereby causing a "ghost image" or flare in the final positive print.

The reflex optical system shown in FIGS. 2 through 4 feature a reflex mirror which is at an angle $\alpha$ of less than 45° with respect to the plane of the film unit thereby requiring that the optic axis AB of the lens is oblique with respect to the plane of the film unit. A camera embodying such a reflex optical system is disclosed in the previously mentioned U.S. Pat. No. 3,678,831.

This camera includes a housing which has a lower section for receiving a container holding a plurality of self-developing integral film units. The bottom of the camera is defined by a planar bottom wall of the camera housing. If the camera is rested on a horizontal surface, such as a table, the oblique optic axis AB would intersect the table or support surface at a short distance in front of an objective lens. This means that if the user wishes to photograph a subject that is in a plane substantially normal to the plane of the table, the bottom wall of the camera housing must be elevated at its forward end to raise the lens axis AB to a position where the optic axis AB is substantially parallel with the support surface.

Quite often, it is desirable to use such a table or support surface to steady the camera in an upright position to make relatively long interval exposures of dimly illuminated subjects. In order to raise the leading end of the camera so that the objective lens 32 is pointing at the subject, it is generally necessary to wedge an object such as a book of matches or a pack of cigarettes under the leading end of the camera. This procedure is at best a frustrating experience for the photographer and generally the results are less than perfect.

FIG. 6 of the drawings shows a camera 40 which has been designed with the aid of the preceding graphical techniques to include: 1) a lens axis which is parallel to the bottom wall of the camera housing; 2) a camera housing that is of minimum height; and 3) a reflex optical system that does not exhibit the flare effect.

Camera 40 includes an upper housing section 42 which forms an enclosure or exposure chamber for the reflex optical system, and a base or bottom housing section 44 for receiving and supporting a film container holding a plurality of film units 10 and for mounting appropriate mechanisms for processing the film units 10 subsequent to exposure.

Base section 44 is generally parallelpiped in shape and includes a planar bottom wall 46, leading and trailing end walls 48 and 50, respectively, a pair of enclosing side walls (not shown) joining the peripheral edges of bottom wall 46 with the end walls 48 and 50 and a leading end top wall 52 within base section 44 an internal plate-like section or member 54 which is in communication with the upper housing section 42.

The walls forming base section 44 define a chamber 56 therein for receiving and supporting a film container 58 which is preloaded with a plurality of self-developing integral film units 10 arranged in stacked relation therein.

Film container 58 includes a bottom wall 60, leading and trailing end walls 62 and 64, respectively, and a forward wall 66 having a square or rectangular exposure aperture 68 therein which is coextensive with the exposure window 22 of the film units. Container 58 also includes a pair of enclosing side walls which are not shown in the drawing. The stack of film units 10 is biased by a spring platen 69 which urges the stack upwardly to locate the forwardmost film unit 10 against the interior surface of forward wall 66 such that it may be exposed by image-bearing light transmitted through the exposure aperture 68. Subsequent to exposure, the forwardmost film unit is engaged by a camera mechanism (not shown) which advances the film unit forwardly through a withdrawal slot 70 in leading end wall 62 and into the bite of a pair of pressure applying members 72 and 74 mounted forwardly of the film withdrawal slot 70. The film unit 10 is advanced between the pressure applying members or rollers 72 and 74 which cause the discharge and distribution of the fluid processing composition 26 between a pair of predetermined layers of the film unit. As the film unit 10 emerges from rollers 72 and 74, it exits the camera through an exit slot 76 is the leading forward end wall 48 of the bottom section 44.

Camera 40 also includes appropriate mechanisms for facilitating viewing and focusing, exposure control and film transport. Since these mechanisms are well known in the art and form no part of the present invention, they will not be shown in the drawings or described in detail.

Although not shown in the drawings, the base housing section 44 may include a film container loading door in bottom wall 46 or housing section 44 may be made in sections so that a leading end section at a dividing line between the rollers 72 and 74 in the leading end wall 62 of the film container 58 may pivot downwardly to provide access for loading the film container 58 into the receiving chamber 56.

It will be noted that the film container 58 is tapered or wedge shaped and is thicker at the leading end than at the trailing end to accommodate the extra thickness of the fluid containing pods 24 at the leading end of the film units 10. Due to this configuration, the forward and rear walls of the container 66 and 60 are not in parallel relation.

In the embodiment of camera 40 shown in FIG. 6, the bottom wall 60 of film container 58 is supported on and in parallel relation to the bottom wall 46 of base housing section 44. This means that the forward planar wall 66 of film container 58 slopes downwardly from its leading end to its trailing end being approximately 2° off a parallel relationship with the bottom wall 46 of lower housing section 44. This slight inclination is caused by the wedge shaped configuration of the film container 58.

Positioned over the forward wall 66 of film container 58 is the interior plate-like section 54. Section 54 includes an opening 78 therein which is coextensive with the exposure aperture 68 of the film container 58. Plate-like section 54 is disposed in parallel relation to the angled forward wall 66 of the film container and serves as a means for defining an exposure plane 79 of camera 40. The outer surface of container forward wall 66 is adapted to bear against the underside of plate 54 which serves as a reference surface to locate the forwardmost film unit in container 58 at the camera's exposure plane 79. The exposure plane 79 is not in a plane coinciding with the underside of plate 54 but rather is a plane below the underside surface of plate 54 at a distance equal to the thickness of the container forward wall 66. Thus, the exposure plane 79 of camera 40 is inclined by 2° with respect to the planar bottom wall 46 of base section 44.

The upper housing section 42 is positioned over the plate 54 in lighttight closing relation thereto. Section 42 includes a forward wall 80, a top wall 82, a rear wall 84 and a pair of side walls (not shown). These walls in cooperation with plate 54 define an exposure chamber 86 for enclosing the reflex optical path between the camera's objective lens 32 and exposure plane 79.

As noted earlier, camera 40 is designed such that the optic axis AB of the objective lens 32 will be parallel, or at least substantially parallel, to the bottom wall 46 of lower housing section 44.

With the lens axis AB parallel to bottom wall 46, the condition that this center ray segment BC be normal to the camera's exposure plane 79 and impinge the center of the film unit exposure window 22 must be satisfied. When this condition is satisfied, center ray segments AB and BC subtend an angle of 88° because of the 2° downward slope of the exposure plane 79 relative to the planar bottom wall 46. This information in turn is used to determined the angle $\alpha$ of mirror 34 with respect to the exposure plane 79. In this case, $\alpha$ is 44°.

If $\beta$ equals the angle of the exposure plane 79 with respect to the planar bottom wall 46, or a line parallel thereto, then $\alpha$, the angle of the mirror 34 with respect to exposure plane 79 (a plane parallel to plate-like section 54) may be determined by the formula $$\alpha = 45° - 1/2\beta$$

In the illustrated embodiment, $\beta = 2°$. Therefore, $\alpha = 44°$. If the exposure plane is parallel to the bottom wall 46, $\beta = 0°$ and $\alpha = 45°$. Should the exposure plane slope be opposite that shown in FIG. 6, a negative angle $\beta$ should be used in the formula. In this case, $\alpha$ will be greater than 45°.

Once the angular disposition of optic axis AB and mirror 34 have been determined, then the height of mirror 34 above the exposure plane is determined through the previously described graphical analysis such that the light ray L"RX impinges the exposure plane at or preferably to the left of point E. In the illustrated camera 40, the lens 32 has a back focal length of 3.470 inches, and the height of the mirror measured along line segment BC of center ray ABC is 2.150 inches. The highest point of the mirror point M is 2.750 inches above the exposure plane.

After the dimensions of the optical system have been determined, the upper housing section may be designed so that the size of exposure chamber 86 is minimized.

The lens 32 is mounted on upper housing section forward wall 80 along with a shutter mechanism (not shown). The reflex mirror 34 may be attached to the interior surface of sloping rear wall 84 which is preferably disposed at an angle of 44° with respect to the exposure plane so that mirror 34 may be secured in parallel relation thereto. Again, mirror 34 is of a length, measured between points M and R, which intercepts the edge rays of the cone of light emanating from lens 32 but is no longer than necessary to perform this function.

It was noted earlier that secondary light rays reflected from the transparent outer sheet 14 of the film unit 10 may impinge upon mirror 34, but they do so at angles of incidence whereby mirror 34 directs the secondary rays to locations within the chamber 86 that are outside the bounds of the square exposure window 22 of the forwardmost film unit. In order to prevent these directed rays from being reflected or scattered from interior surfaces of upper housing section 42, the interior surfaces of the walls of the upper housing section 42 should include appropriate baffles or light absorbing and/or attenuating means. Such light absorbing baffles are well known to those skilled in the photographic art and are diagrammatically illustrated in FIG. 6, carrying the designation 88. These may include irregular surfaces of dark light absorbing materials which form ridges or labyrinths for absorbing and/or attenuating light in a well known manner.

The illustrated camera 40 is intended to provide a vehicle for disclosing the inventive concepts disclosed herein. It will be obvious to those skilled in the art that the optical system disclosed may be used in folding cameras, cameras that have an exposure plane that is parallel to the planar bottom wall, and cameras that include multiple reflex mirrors such as disclosed in U. S. Pat. No. 3,791,274. Since certain changes may be made in the above apparatus without departing from the scope of the invention herein involved, it is intended that all matter contained in the above description or shown in the accompanying drawings shall be interpreted as illustrative and not so illustrative and not in a limiting sense.

What is claimed is:

1. A compact camera having a reflex optical system for directing image-bearing light onto a film unit of the type having a substantially transparent outer sheet defining a substantially planer exposure window of a given length and width through which image-bearing light is to be transmitted to expose photosensitve materials within the film unit, the substantially transparent sheet having the characteristic of reflecting a small portion of image-bearing light incident thereupon, said compact camera comprising:

a housing including a base section having a substantially planar bottom wall;

means defining an exposure plane within said base section at which such a film unit may be located in position for exposure, said exposure plane being positioned above and at a predetermined angle with respect to said substantially planar bottom wall;

optical means including a lens mounted on said housing for transmitting light bearing an image of a scene to be photographed, said lens having an optical axis and being mounted on said housing such that said optical axis is substantially parallel to said bottom wall of said housing; and reflex means including a substantially planar mirror mounted within said housing for reflecting image-bearing light from said lens onto such a film unit located in position for exposure, said mirror being positioned at a predetermined angle with respect to said exposure plane such that a central ray of the image-bearing light is reflected by said mirror and is incident upon the center of the film unit exposure window in a direction that is normal thereto, when the film unit exposure window is located in position for exposure said mirror also being positioned with respect to said exposure plane such that the height of said central ray of image-bearing light between its point of reflection by said mirror and its point of incidence at the center of the film unit exposure window when located in position for exposure is shortened to the minimum distance at which all of the image-bearing light rays reflected back from the transparent sheet of the film unit to said mirror are then redirected by said mirror to locations within said housing that are outside of the film unit exposure window when located in position for exposure.

2. A compact camera as defined in claim 1 wherein said mirror is of a predetermined length which is no longer than necessary to intercept edge rays of a cone of imagebearing light transmitted by said lens.

3. A compact camera as defined in claim 1 wherein $\beta$ equals the predetermined angle of said exposure plane with respect to said planar bottom wall of said housing and $\alpha$ equals said predetermined angle of said mirror with respect to said exposure plane and the value of $\alpha$ is determined by the formula $\alpha = 45° - 1/2\beta$.

4. A compact camera as defined in claim 1 wherein said mirror provides a first virtual image of said lens and, in combination with the reflective characteristic of the substantially transparent outer sheet of the film unit, when located in position for exposure provides a second virtual image of the lens of lesser intensity than said first virtual image, said minimum height of said central ray of image-bearing light being established such that secondary light rays emanating from a lower edge of said mirror closest to said exposure plane intercept said exposure plane at or beyond a boundary of the exposure window of the film unit located in position for exposure so that said secondary light rays may not be transmitted through the exposure window to cause a secondary exposure of photosensitive materials within the film unit.

5. A compact camera as defined in claim 1 further including means defining an enclosure around an optical path from said lens to said mirror and then to said exposure plane, said enclosure defining means including light absorbing means for absorbing light rays directed outside the bounds of the exposure window of a film unit located in position for exposure to prevent such light rays from being directed through the exposure window with sufficient intensity to cause a secondary exposure of the film unit.

6. A compact camera as defined in claim 1 wherein the film unit is of the type including a container holding a supply of fluid processing composition and said camera further including processing means for effecting the discharge and distribution of the fluid within the film unit subsequent to exposure.

7. A compact camera as defined in claim 6 wherein said base section includes means therein defining a chamber for receiving a film container holding a plurality of such film units.

8. A compact camera for use with a film unit having an exposure image area of a given length and width and further having the characteristic of reflecting a small portion of light rays thereonto, said camera comprising;

a housing;

an objective lens having an optic axis and being mounted on said housing;

a mirror mounted within said housing for receiving image-bearing light rays from a scene being photographed which enter said housing through said lens, and for redirecting said image-bearing light rays; and means within said housing for positioning the film unit to extend with the length of its exposure area disposed at an angle to said mirror so that the entire exposure area of the film unit when so positioned is illuminated by said redirected image-bearing light rays, said film unit positioning means being disposed within said housing to locate the positioned film unit at a focal plane of said lens;

said film unit positioning means being arranged and said mirror being disposed at an angle with respect to said optic axis of said lens such that the one ray of said image-bearing light rays travelling along said optic axis is redirected by said mirror onto the positioned film unit at a point substantially coincident with the center of its exposure area and in a direction substantially normal to the positioned film unit, said mirror being spaced from the positioned film unit a predetermined distance, as measured along the line which said one ray travels after being so redirected by said mirror, so that all of the image-bearing light rays redirected by said mirror onto the exposure area of the positioned film unit and reflected back therefrom onto said mirror are then redirected a second time by said mirror to locations within said housing that are outside of the exposure area of the positioned film unit with the ones of said image-bearing light rays reflected by the positioned film unit back onto the portion of said mirror closestmost disposed with respect to the positioned film unit being redirected said second time by said mirror to a location within said housing substantially contiguous with the exposure area of the positioned film unit.

9. The camera of claim 8 wherein the length of said mirror in the direction it extends at said angle to the positioned film unit is substantially limited to that required to intercept and redirect image-bearing light rays from said lens onto the exposure area of the positioned film unit.

10. The camera of claim 8 wherein said location within said housing substantially contiguous with the exposure area of the positioned film unit is substantially coincident to the exposure area of the positioned film unit while remaining outside the exposure area of the positioned film unit.

11. A compact camera for use with a film unit having an exposure image area of a given length and width having the characteristic of reflecting a small portion of light rays directed thereonto, the film unit further including a binding member serving to provide an exposure insensitive frame around its exposure image area and to define the peripheral edges of the film unit, said camera comprising;

a housing;

an objective lens having an optic axis and being mounted on said housing;

a mirror mounted within said housing for receiving image-bearing light rays from a scene being photographed which enter said housing through said lens, and for redirecting said image-bearing light rays; and means within said housing for positioning the film unit to extend with the length of its exposure area disposed at an angle to said mirror so that the entire exposure area of the film unit when so positioned is illuminated by said redirected image-bearing light rays, said film unit positioning means being disposed within said housing to locate the positioned film unit at a focal plane of said lens;

said film unit positioning means being arranged and said mirror being disposed at an angle with respect to said optic axis of said lens such that the one ray of said image-bearing light rays travelling along said optic axis is redirected by said mirror onto the positioned film unit at a point substantially coincident with the center of its exposure area and in a direction substantially normal to the positioned film unit, said mirror being spaced from the positioned film unit a predetermined distance, as measured along the line which said one ray travels after being so redirected by said mirror, so that all of the image-bearing light rays redirected by said mirror onto the exposure area of the positioned film unit and reflected back therefrom onto said mirror are then redirected a second time by said mirror to locations within said housing that are outside of the exposure area of the positioned film unit with the ones of said image-bearing light rays reflected by the positioned film unit back onto the portion of said mirror closestmost disposed with respect to the positioned film unit being redirected said second time by said mirror in the directon of the positioned film unit's binding member.

12. A camera and film apparatus comprising:

a film unit having an exposure image area of a given length and width and further having the characteristic of reflecting a small portion of light rays thereonto;

a housing;

an objective lens having an optic axis and being mounted on said housing;

a mirror mounted within said housing for receiving image-bearing light rays from a scene being photographed which enter said housing through said lens, and for redirecting said image-bearing light rays; and means within said housing for positioning said film unit to extend with the length of its exposure area disposed at an angle to said mirror so that the entire exposure area of said film unit is illuminated by said redirected image-bearing light rays, said film unit positioning means being disposed within said housing to locate said film unit at a focal plane of said lens;

said film unit positioning means being arranged and said mirror being disposed at an angle with respect to said optic axis of said lens such that the one ray of said image-bearing light rays travelling along said optic axis is redirected by said mirror onto said film unit at a point substantially coincident with the center of its exposure area and in a directon substantially normal to said film unit, said mirror being spaced from said film unit a predetermined distance, as measured along the line which said one ray travels after being so redirected by said mirror, so that all of the image-bearing light rays redirected by said mirror onto the exposure area of said film unit and reflected back therefrom onto said mirror are then redirected a second time by said mirror to locations within said housing that are outside of the exposure area of said film unit with the ones of said image-bearing light rays reflected by said film unit back onto the portion of said mirror closestmost disposed with respect to said film unit being redirected said second time by said mirror to a location within said housing substantially contiguous with the exposure area of said film unit.

13. The apparatus of claim 12 wherein the length of said mirror in the direction it extends at said angle to said film unit is substantially limited to that required to intercept and redirect image-bearing light rays from said lens onto the exposure area of said film unit.

14. The camera of claim 12 wherein said location within said housing substantially contiguous with the exposure area of said film unit is substantially coincident to the exposure area of said film unit while remaining outside the exposure area of said film unit.

15. A camera and film apparatus comprising:
a film unit having an exposure image area of a given length and width having the characteristic of reflecting a small portion of light rays directed thereonto, said film unit furthur including a binding member serving to provide an exposure insensitive frame around its exposure image area and to define the peripheral edges of said film unit;
a housing;
an objective lens having an optic axis and being mounted on said housing;
a mirror mounted within said housing for receiving image-bearing light rays from a scene being photographed which enter said housing through said lens, and for redirecting said image-bearing light rays; and
means within said housing for positioning said film unit to extend with the length of its exposure area disposed at an angle to said mirror so that the entire exposure area of said film unit is illuminated by said redirected image-bearing light rays, said film unit positioning means being disposed within said housing to locate said film unit at a focal plane of said lens;
said film unit positioning means being arranged and said mirror being disposed at an angle with respect to said optic axis of said lens such that the one ray of said image-bearing light rays travelling along said optic axis is redirected by said mirror onto said film unit at a point adjacent the center of its exposure area and in a direction substantially normal to said film unit, said mirror being spaced from said film unit a predetermined distance, as measured along the line which said one ray travels after being so redirected by said mirror, so that all of the image-bearing light rays redirected by said mirror onto the exposure area of said film unit and reflected back therefrom onto said mirror are then redirected a second time by said mirror to locations within said housing that are outside of the exposure area of said film unit with the ones of said image-bearing light rays reflected by said film unit back onto the portion of said mirror closestmost disposed with respect to said film unit being redirected said second time by said mirror in the direction of said film unit's binding member.

* * * * *